(12) United States Patent
Thomson et al.

(10) Patent No.: US 8,393,429 B2
(45) Date of Patent: Mar. 12, 2013

(54) VARIABLE WHEELBASE MOTOR GRADER

(75) Inventors: Norval Thomson, Dunlap, IL (US);
Steven Daniel, East Peoria, IL (US);
Daniel Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 119 days.

(21) Appl. No.: 12/938,861

(22) Filed: Nov. 3, 2010

(65) Prior Publication Data

US 2011/0108294 A1    May 12, 2011

Related U.S. Application Data

(60) Provisional application No. 61/258,897, filed on Nov. 6, 2009.

(51) Int. Cl.
*B62D 61/12* (2006.01)
*B62K 13/00* (2006.01)

(52) U.S. Cl. ........................... 180/209; 172/780
(58) Field of Classification Search .................. 37/410; 172/798, 799, 278, 178, 1, 4.5, 781, 780; 180/209, 900, 233, 242; 280/429, 149.2, 280/475, 124.111
See application file for complete search history.

(56) References Cited

U.S. PATENT DOCUMENTS

| | | | |
|---|---|---|---|
| 2,753,064 A | 7/1956 | Lesser | |
| 3,266,180 A * | 8/1966 | Toland | 172/780 |
| 3,954,198 A * | 5/1976 | Sedelmayer | 414/429 |
| 3,966,220 A | 6/1976 | Forsyth et al. | |
| 4,580,805 A | 4/1986 | Bertolini | |
| 4,611,683 A * | 9/1986 | Hilmer | 180/209 |
| 4,848,012 A * | 7/1989 | Zimmerman | 37/408 |
| 5,013,058 A | 5/1991 | Kruger | |
| 5,368,121 A | 11/1994 | Priefert | |
| 5,722,674 A | 3/1998 | Dawson | |
| 5,863,057 A | 1/1999 | Wessels | |
| 5,879,124 A | 3/1999 | Brouwer et al. | |
| 6,065,556 A | 5/2000 | Andrews | |
| 6,547,028 B1 | 4/2003 | Green | |
| 6,612,773 B2 * | 9/2003 | Gray | 404/94 |
| 6,623,208 B2 * | 9/2003 | Quenzi et al. | 404/84.8 |
| 2008/0000658 A1 | 1/2008 | Howson et al. | |
| 2009/0206589 A1* | 8/2009 | Osswald et al. | 280/782 |

FOREIGN PATENT DOCUMENTS

| | | | |
|---|---|---|---|
| JP | 55039573 A | * | 3/1980 |
| JP | 04330122 A | * | 11/1992 |
| JP | 2002308158 A | * | 10/2002 |

* cited by examiner

*Primary Examiner* — Arpad Fabian-Kovacs
(74) *Attorney, Agent, or Firm* — Miller, Matthias & Hull

(57) ABSTRACT

A motor grader with an adjustable wheelbase. The motor grader may include front and rear wheels supporting a chassis and a main frame. A working blade may downwardly depend from the main frame between the front wheels and rear wheels to perform work on the ground below. The motor grader may also provide an adjustable wheel base to allow the center of gravity of the motor grader to better match the work load being addressed. The adjustable wheel base may also provide more swing clearance for the blade relative to the rear wheels, allow for an adjustable articulation angle, and minimize structural loads on the motor grader, particularly during ripping operation. The wheel base may be adjustable by providing structure through which the relative positions of the rear wheels can be altered automatically, manually, and dynamically.

14 Claims, 8 Drawing Sheets

VARIABLE WHEELBASE MOTOR GRADER

CROSS-REFERENCE TO RELATED APPLICATION

This application is a non-provisional application claiming priority under 35 USC §119 (e) to U.S. Provisional Application Ser. No. 61/258,897 filed on Nov. 6, 2009.

TECHNICAL FIELD

The present disclosure generally relates to construction vehicles and, more particularly, relates to motor graders.

BACKGROUND

Motor graders are common vehicles used in, among other things, road construction and maintenance for displacing, distributing, and leveling material such as soil, gravel, snow, and the like. Such machines typically include front and rear wheels with a relatively high main frame connecting the two. A work blade downwardly depends from the main frame. When in use the blade can be lowered so as to contact the ground below and when the vehicle moves forward, the material on the ground is pushed forward by the blade. The blade is also rotatable so as to displace more or less material as is desired for the given job.

With some motor graders, the rear of the vehicle is provided with tandem rear drives such that the overall machine has six wheels. Tandem rear drives provide the motor grader with additional power, traction and stability. Another feature common on motor graders is the attachment of a ripper tool on the rear of the vehicle. Such tools have a plurality of downwardly directed tines or claws which penetrate and drag along the ground when the vehicle moves forward. Ripper attachments are useful for breaking the top surface of the ground, be it compacted soil, turf, gravel or pavement. Once ripped, the ground can then be graded with the aforementioned blade.

While such machines are very useful and have been met with substantial commercial success since their introduction, improvements continue to be sought. For example, it would be advantageous to provide a motor grader with an adjustable center of gravity. One instance where this would be desirable would be when using the ripper attachment. As such a tool is placed behind the vehicle and creates a significant downward drag, it would be beneficial to have a vehicle with a center of gravity positionable to best address that load.

In addition, in certain operations it may be desirable to operate the grader with the blade rotated at an aggressive angle, i.e., up to being practically parallel with the longitudinal axis of the grader. However, with current technology this may inadvertently result in tire or wheel damage if the blade is rotated into engagement with the rear tandem wheel.

In still further instances, the motor grader might be tasked with grading the surface in question down to a tenth of an inch or less. For example, if finish grading a road surface just prior to application of concrete or asphalt, every deviation from that tolerance will result in additional concrete or asphalt being required, thereby increasing the cost of the job. With current graders, no ability exists to adjust the wheel base and thus if a surface to be graded is particularly uneven, this will result in a limited ability to meet that tolerance as the movement of one wheel due to an obstruction or the like on the surface to be graded will result in vertical displacement of the grader and blade. Alternatively, the grader will have to make multiple passes to meet the tolerance, also resulting in additional cost.

Finally, the main frame of a typical grader is able to turn or articulate with respect to the chassis or rear of the grader. As currently available graders have a wheel base of fixed length, the articulation angle and turning radius of the grader are also fixed. However, in certain situations it may be desirable to have an adjustable articulation angle. One example would be when grading a surface provided at an incline to the roadway such as a berm, culvert, ditch or the like. In such situations, the rear wheels of the grader may be on a flat level surface with the front wheel, main frame and blade articulated away from the rear wheels so as to be over the inclined surface being graded.

SUMMARY OF THE DISCLOSURE

In accordance with one aspect of the disclosure, a motor grader is disclosed which comprises a chassis, a main frame extending from the chassis, a blade extending downwardly from the main frame, front wheels supporting the main frame, an engine supported by the chassis, and rear wheels supporting the chassis, the rear wheels having an adjustable position relative to a longitudinal axis of the chassis.

In accordance with another aspect of the disclosure, a method of operating a motor grader is disclosed, which comprises providing wheels on the motor grader with adjustable positions relative to a longitudinal axis of the motor grader, and moving the wheels to adjust a wheel base of the motor grader.

In accordance with a still further aspect of the disclosure, a motor grader is disclosed which comprises a main frame, a blade extending downwardly from the frame, and front and rear wheels mounted relative to the frame and each supporting a percentage of the overall weight of the motor grader, the percentage of weight being supported by each wheel being adjustable.

DETAILED DESCRIPTION

Figure 1:
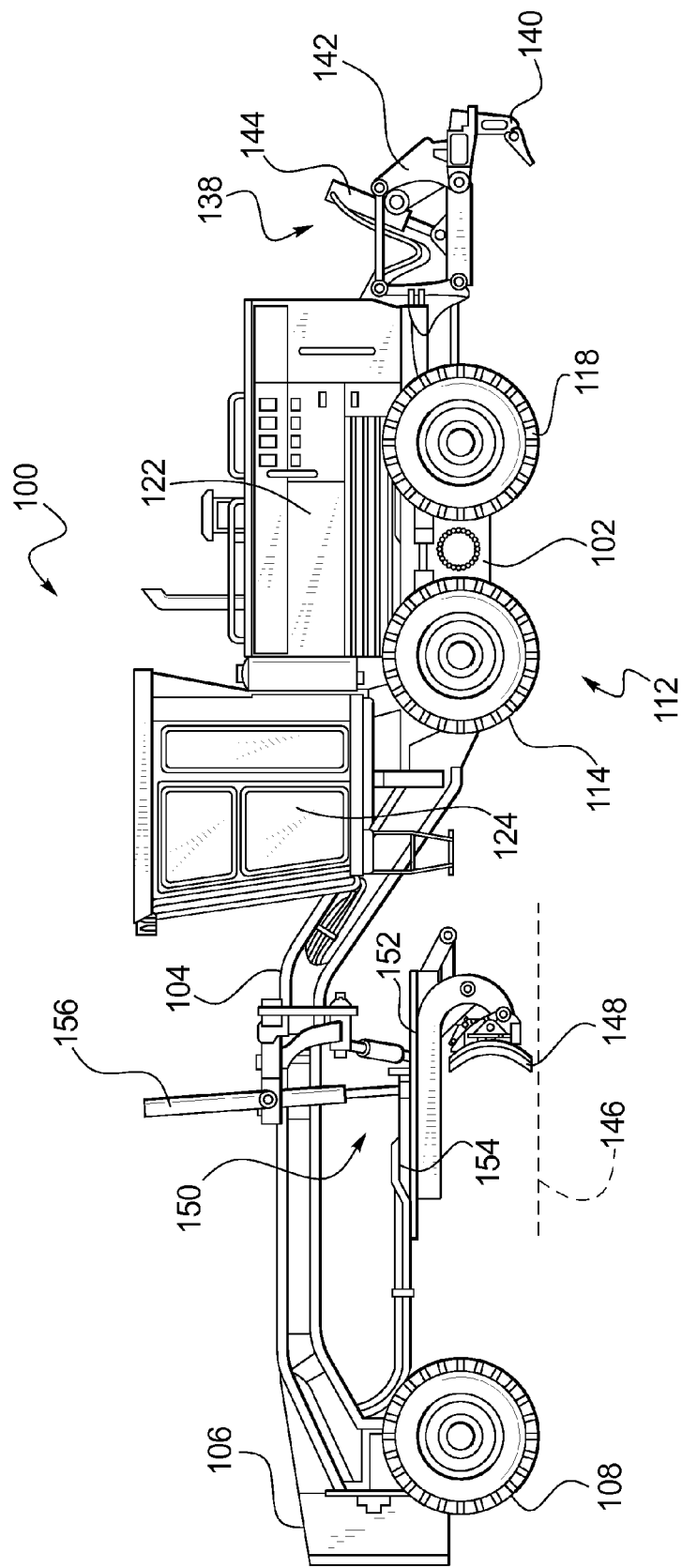
FIG. 1 is a side elevational view of one embodiment of a motor grader constructed in accordance with the teachings of this disclosure.

Referring now to the drawings, and with specific reference to FIG. 1, a motor grader constructed in accordance with the present disclosure is generally referred to by reference numeral 100. The motor grader 100 may include a chassis 102 from which forwardly extends a main frame 104. A forward end 106 of the main frame 104 may be supported by front wheels 108, 110. The chassis 102 may be supported by a tandem drive 112 including a first set of rear wheels 114, 116, and a second set of rear wheels 118 and 120, as shown best in FIG. 3. In alternative embodiments only a single set of rear wheel wheels may be provided, however, with a tandem drive system all four rear wheels are powered. The chassis 102 may support an engine 122 and an operator cab 124 as one of ordinary skill in the art will readily understand.

Each of the wheels 114, 116, 118 and 120 may be powered by a hydrostatic (Hystat) transmission 126. In such an arrangement, as shown schematically in FIG. 8, the engine 122 powers a hydraulic pump 128. Pressurized hydraulic fluid from the pump 128 is then communicated by suitable hoses 130 to one or more hydrostatic motors 132 to drive same. A rotating shaft 134 extending from the motor 132 is then connected directly to one of the wheels 114, 116, 118, 120 by way of a final drive 136 or the like. A separate motor 132 may be provided for each wheel 114, 116, 118, 120, or through suitable couplings such as chains and sprockets one motor 132 could be used to power more than one wheel 114, 116, 118, 120.

In any event, by using such a hydrostatic transmission 126, the wheels and associated motors can be more easily moved compared to conventional mechanical drive shaft arrangements in that the engine 122 and pump 128 can stay fixed, and the motor(s) 132 and associated wheel(s) 114, 116, 118, 120 can move using one of the structural arrangements described later herein, with the flexible hoses 130 being provided with sufficient lengths to accommodate such changes in position. In other embodiments, the wheels 114, 116, 118, 120 may be mechanically driven by other mechanisms including, but not limited to, a driveshaft connecting the engine to axles extending between laterally mounted pairs of wheels, chains and sprockets, electric drives and motors, and other systems known to those of ordinary skill in the art.

Referring again to FIG. 1, rearward of the engine 122, a ripper attachment 138 may be coupled to the motor grader 100. The ripper attachment 138 may include a plurality of downwardly directed tines or claws 140 extending from a frame 142, as well as a hydraulic cylinder 144 for raising and lowering the ripper attachment 138. When lowered, the tines 140 engage ground 146 such that when the motor grader 100 moves forward the ground 146 is displaced. As used herein, the ripper attachment 138 may also be interpreted to include a scarifier, which is basically a lighter weight ripper typically mounted in front of the blade. Both rippers and scarifiers can have a variable number of tines.

Downwardly depending from the main frame 104 is a work blade 148. The work blade 148 may be mounted on a drawbar-circle-moldboard (DCM) 150. The DCM 150 may include a drawbar 152 connected to a circle 154. The circle 154 may include a set of circular gear teeth (not shown) for allowing rotation of the blade 148. In other embodiments, different mechanical or hydraulic arrangements can be provided to allow for rotation of the blade 148, while in still other embodiments, specialized tools other than a blade 148 may be mounted on the DCM 150. Hydraulic cylinders 156 may also be provided to raise and lower the DCM 150 and blade 148 as a whole.

Figure 2:
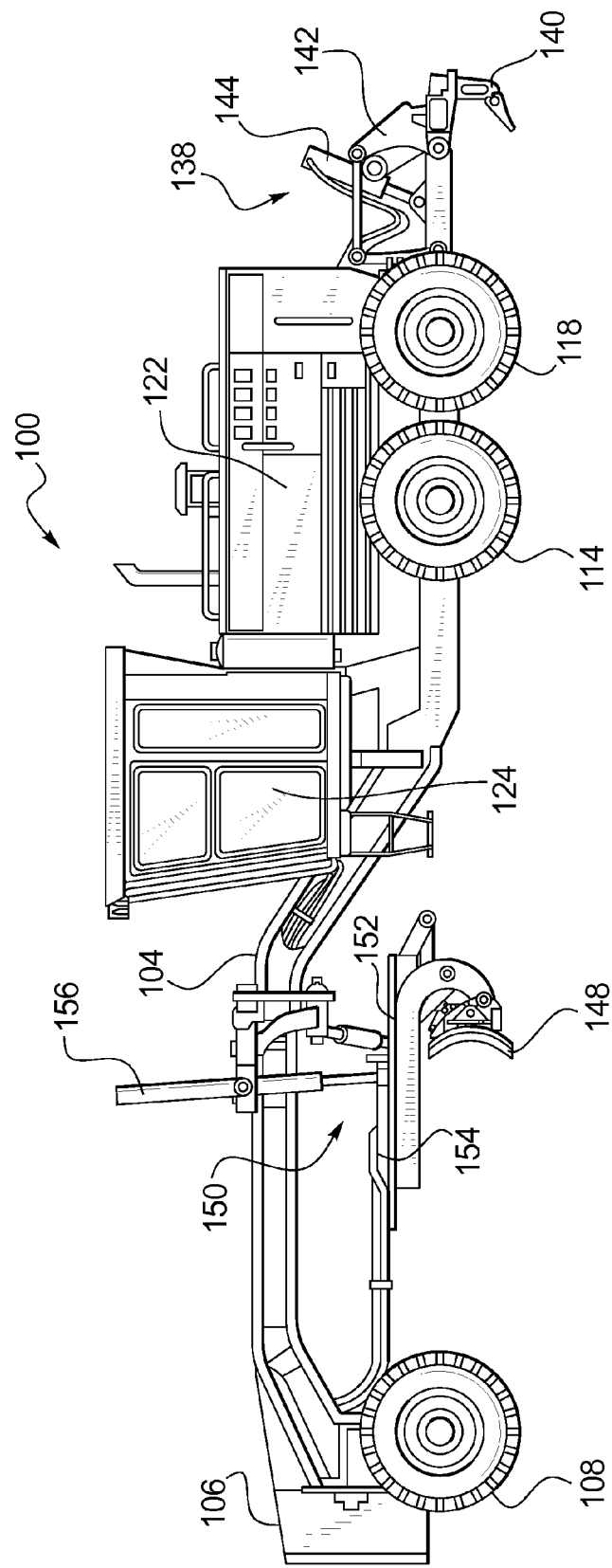
FIG. 2 is a side elevational view similar to FIG. 1, but with the rear axles moved rearward.

Referring now to FIG. 2, it will be seen to be very similar to FIG. 1, but for the positions of the rear wheels 114, 116, 118, 120 relative to a longitudinal axis 158 of the motor grader 100. As shown, all wheels 114, 116, 118, 120 have been moved rearward. By moving the rear wheels 114, 116, 118, 120 rearward this alters the center of gravity of the motor grader 100. For example, with typical motor graders currently on the market the weight distribution on the front and rear wheels is typically 30/70, i.e., 30% on the front wheels and 70% on the rear wheels. However, by moving the wheels 114, 116, 118, 120 rearward this ratio can be changed to a 20/80 distribution or more. Similarly, while not depicted, the rear wheels 114, 116, 118, 120 can all be moved forward of their position in FIG. 1, to thus place the weight distribution more toward a 40/60 split or less. In other embodiments, the rear wheels 114, 116, 118, 120 can all be moved to create an even wider range of load distributions on the front and rear wheels. The percentage of grader weight A supported by the front wheels could range anywhere from 10 to 90 percent, and the percentage of grader weight B supported by the rear wheels could range anywhere from 90 to 10 percent as well. As a frame of reference, typical motor graders manufactured by the present assignee have overall gross weights (A plus B) of between 30,000 and 50,000 pounds.

One application where rearward movement may be advantageous is when using the ripper attachment 138. To reduce mechanical stress on the chassis 102, the wheel wheels 114, 116, 118, 120 may all be moved rearward and thus closer to the ripper attachment 138. This has the effect of shortening the lever arm between rear wheels 114, 116, 118, 120 and the ripper attachment 138. Not only does this reduce the stress in the chassis 102, but it also reduces the downward moment created by the ripper attachment 138 and thus makes the motor grader 100 more stable. This is a significant improvement over prior art motor graders having the fixed 30/70 split mentioned above in that such motor graders often need to attach large counterweights to the front of the motor grader in order to offset the downward moment created when the ripper attachment 138 is in use. By having movable wheels, the need for as much or any counterweight can be reduced. In so doing, not only is the manufacturing cost of the motor grader reduced, but so is its operating cost in that the motor grader can operate with less weight and thus better fuel economy.

Figure 3:
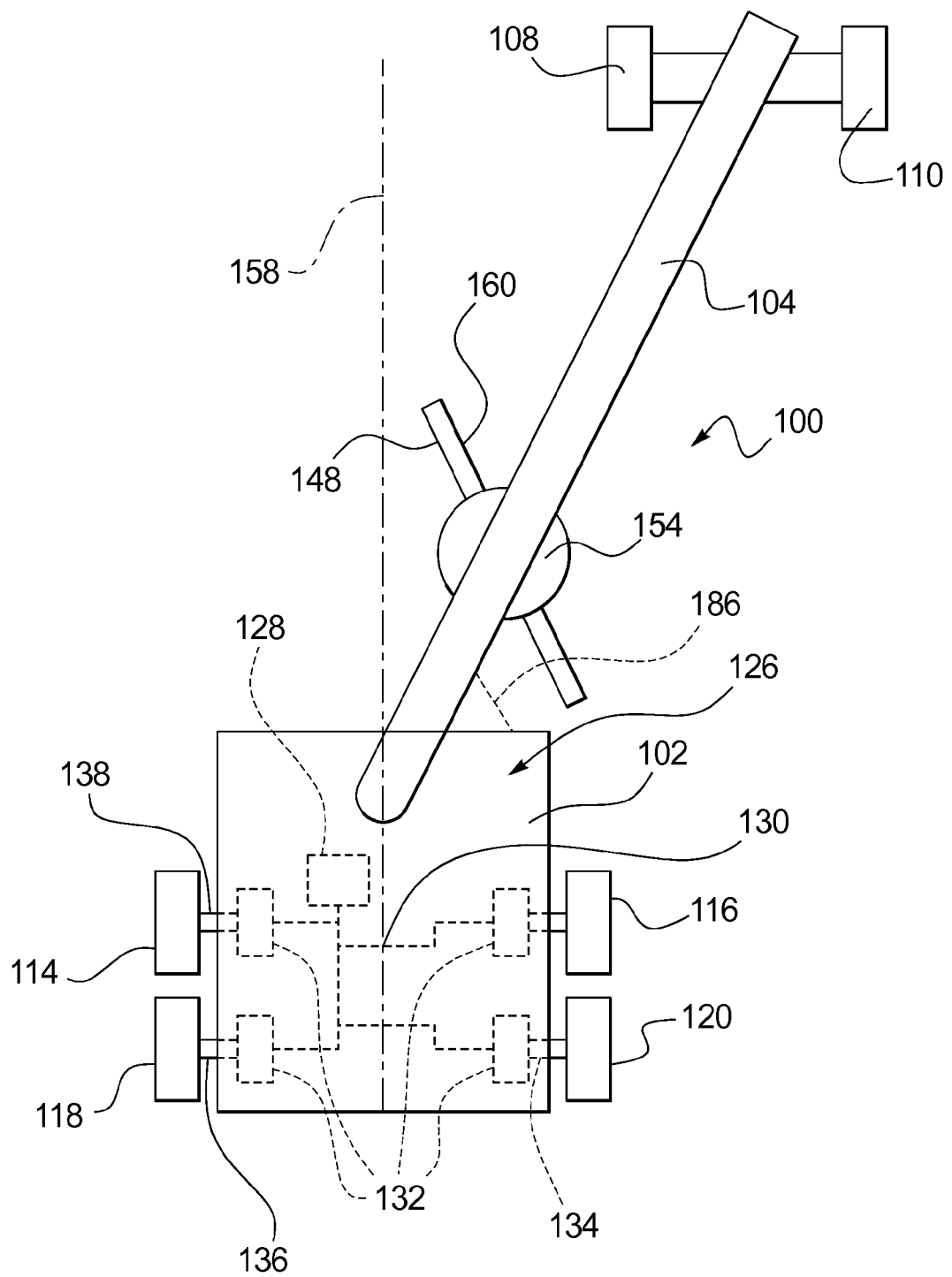
FIG. 3 is a top schematic view of a motor grader constructed in accordance with the teachings of the disclosure.

Moving the rear wheels 114, 116, 118, 120 may also allow the work blade 148 to have a greater swing clearance with respect to the chassis 102 and particularly with respect to the forewardmost rear wheels 114 and 116. For example, as shown in FIG. 3, if the blade 148 is operated at a particularly aggressive angle 160, such as up to being almost parallel to a longitudinal axis 158 of the grader 100, the rear wheels 114, 116 can be moved rearward to allow such movement and avoid damage to the tires on the wheels 114 and 116. This also is a significant improvement over prior art motor graders which either can not operate the blade at such aggressive angles or can only do so at the risk of damaging the rear tires on the motor grader.

Figure 4:
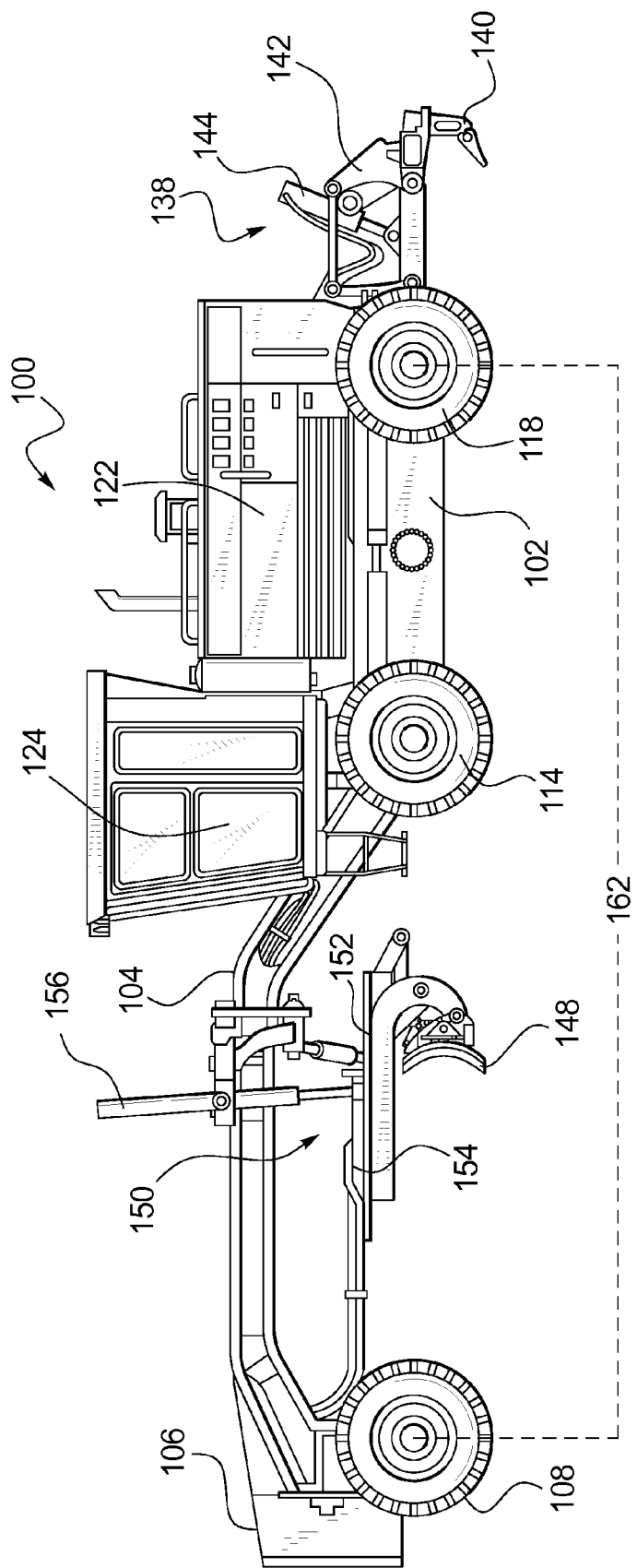
FIG. 4 is a side elevational view similar to FIG. 1, but with the rear axles moved apart.

In the embodiment of FIG. 4, it can be seen that the rear wheels 114, 116, 118, 120 have been moved apart, with wheels 114 and 116 moving forward and wheels 118 and 120 moving rearward. With such an arrangement the weight distribution is more evenly spread over all the motor grader wheels. One application where this may be advantageous is when the work blade 148 is being tasked with finely grading a surface. For example, in certain situations such as when finish grading soil just prior to applying the top layer of asphalt or concrete, it may be desirable to grade the ground 146 down to a tight tolerance, e.g., down to a tenth of an inch or less. If the grading deviates from that, any lowered or raised surface will require additional concrete or asphalt to be added and thus raise the overall cost of the construction project. Alternatively, the grader 100 may be required to make multiple passes before reaching the desired tolerance, again adding to the cost of the project. With currently available graders, this is problematic in that any obstructions in, rocks on, or other significantly uneven portions of, the surface to be graded will cause the grader 100 as a whole to be vertically displaced and thus cause the blade 148 to move as well causing deviations from that desired tolerance. However, the present disclosure allows the wheels 108, 110, 114, 116, 118, 120 to be extended as far apart as possible along the longitudinal axis 158 to thereby lengthen the grader wheel base 162 and abate the effects of those obstructions in the surface 146 to be graded.

Figure 5:
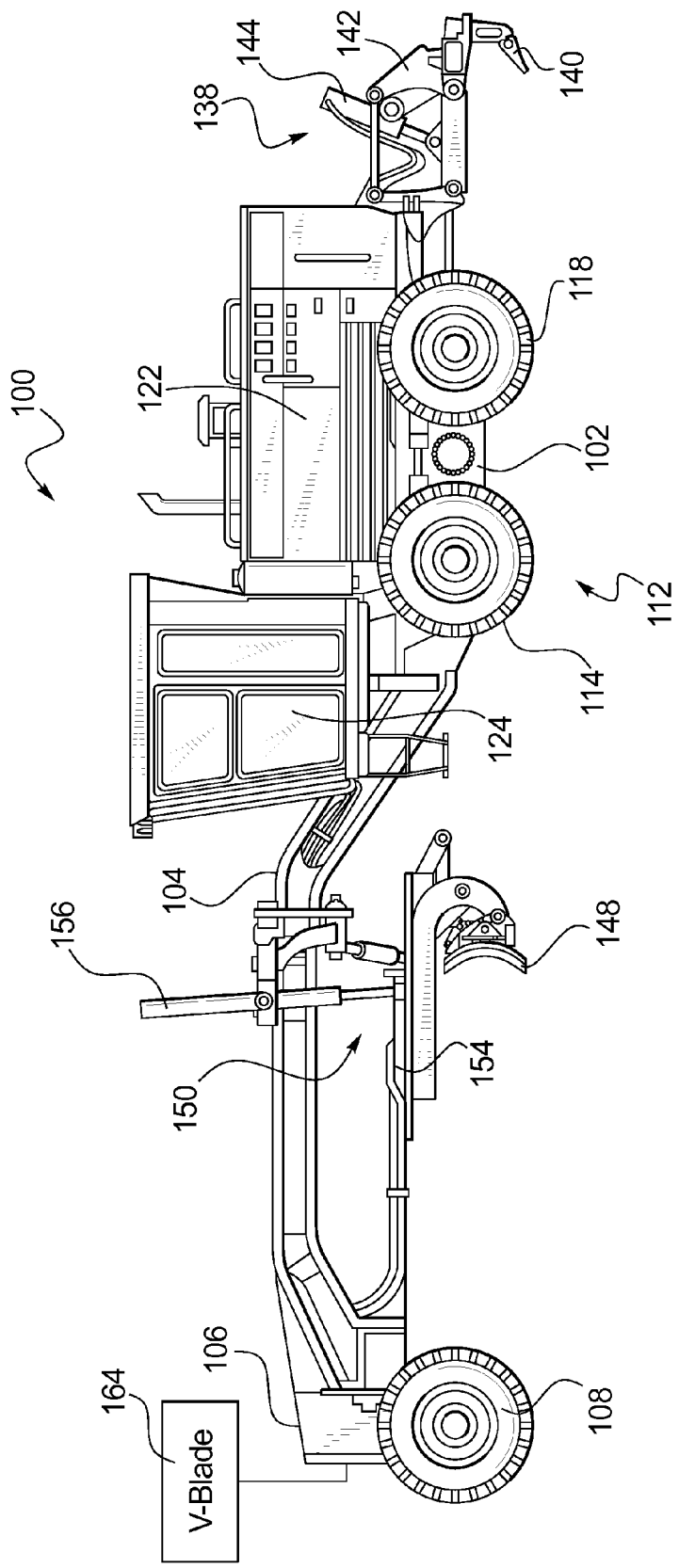
FIG. 5 is a side elevational view similar to FIG. 1, but with a V-blade attachment.

Referring now to FIG. 5, it can be seen to be very similar to FIG. 1, but for a V-blade attachment 164 on motor grader 100 for use in snow plowing applications.

Figure 6:
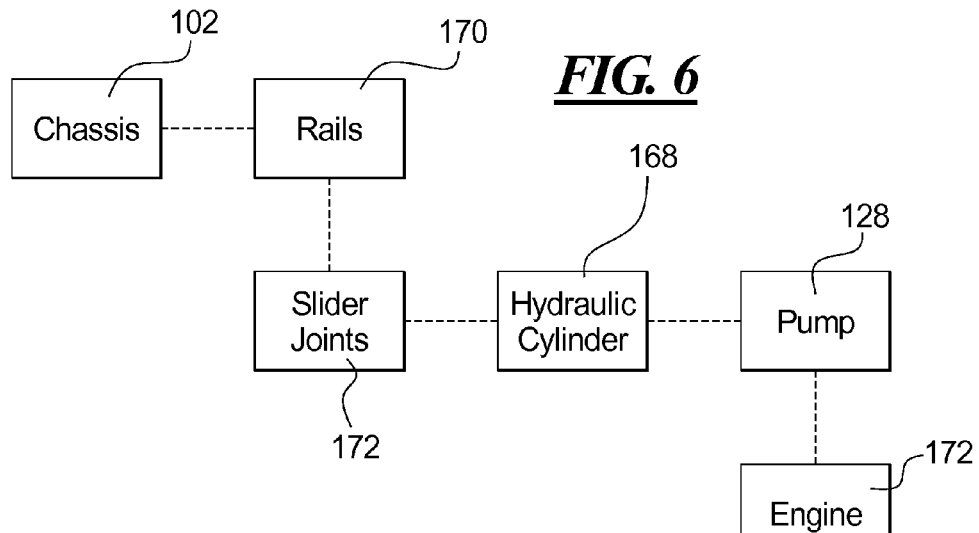
FIG. 6 is a schematic representation of a hydraulic embodiment for moving the axles.
Figure 7:
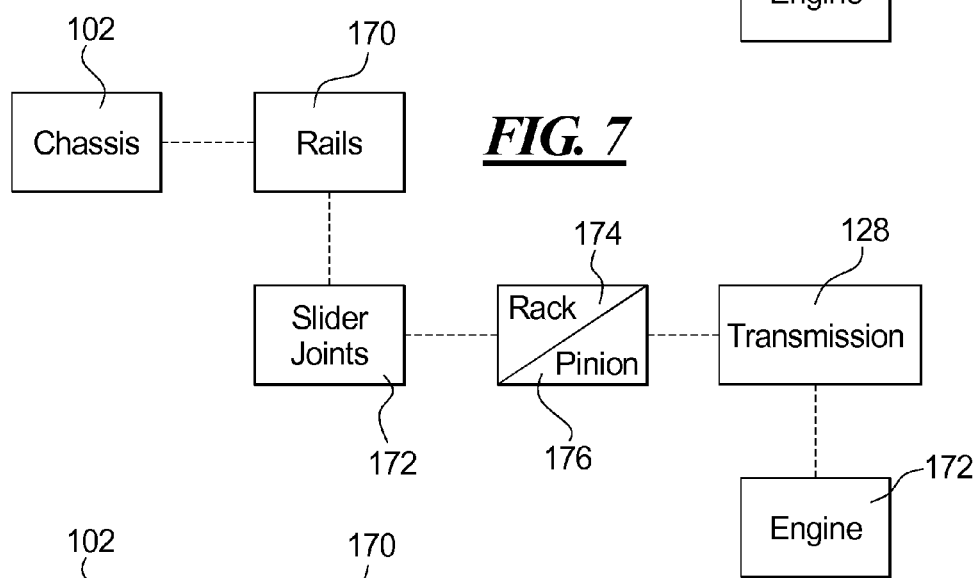
FIG. 7 is a schematic representation of a rack & pinion embodiment for moving the axles.
Figure 8:
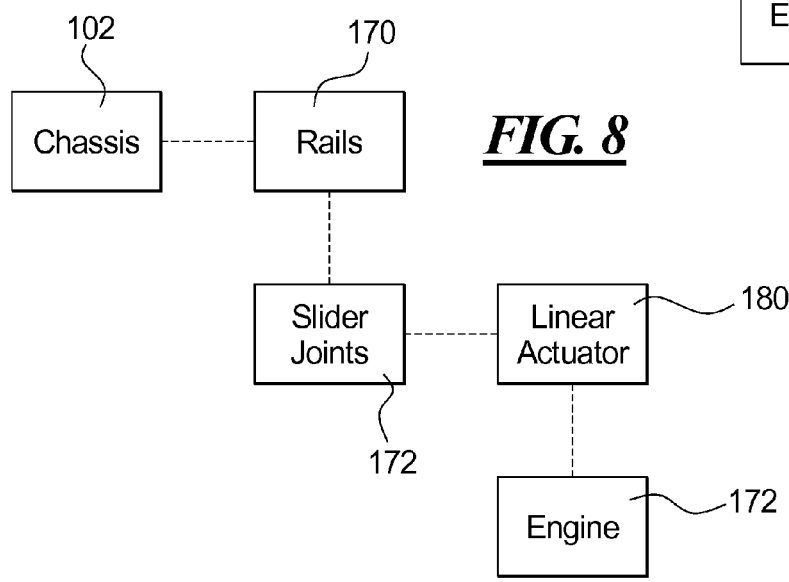
FIG. 8 is a schematic representation of a linear actuator embodiment for moving the axles.

FIGS. 6-8 set forth various arrangements for dynamically moving the wheels 114, 116, 118, and 120. As it would be desirable to be able to move the wheels on-the-fly in the field of use, mechanical structure may be provided to allow for such dynamic change in a safe and repeatable manner. In the first arrangement of FIG. 6, it can be seen that in the case of the rear wheels 114, 116, 118, and 120, a hydraulic cylinder 168 can be attached between the chassis 102 and each of the wheels 114, 116, 118, and 120. The hydraulic cylinder 168 may be fluidically connected to the hydraulic pump 128 powered by the engine 122. When it is desired to move the wheels fore or aft along the longitudinal axis 158, the cylinder 168 can be engaged. Rails 170 can be mounted on the chassis 102 with corresponding slider joints 172 on the motor shafts 134 or final drives 136 to allow for such motion.

Similarly, with the embodiment of FIG. 7, a rack and pinion arrangement can be provided. A rack 174 can be mounted on the chassis 102, with pinions 176 being rotatably associated with each of the wheels 114, 116, 118, and 120. A drive gear or shaft or similar mechanical transmissions components 128 can be connected between the engine 122 and pinions 176 to provide for the power needed to move the wheels 114, 116, 188, and 120.

The embodiment of FIG. 78 provides a linear actuator 180 to move the wheels 114, 116, 118, and 120. Other arrangements for dynamically moving the wheels 114, 116, 118, and 120 will also be apparent to one of ordinary skill in the art and are encompassed by the scope of this disclosure.

Figure 9:
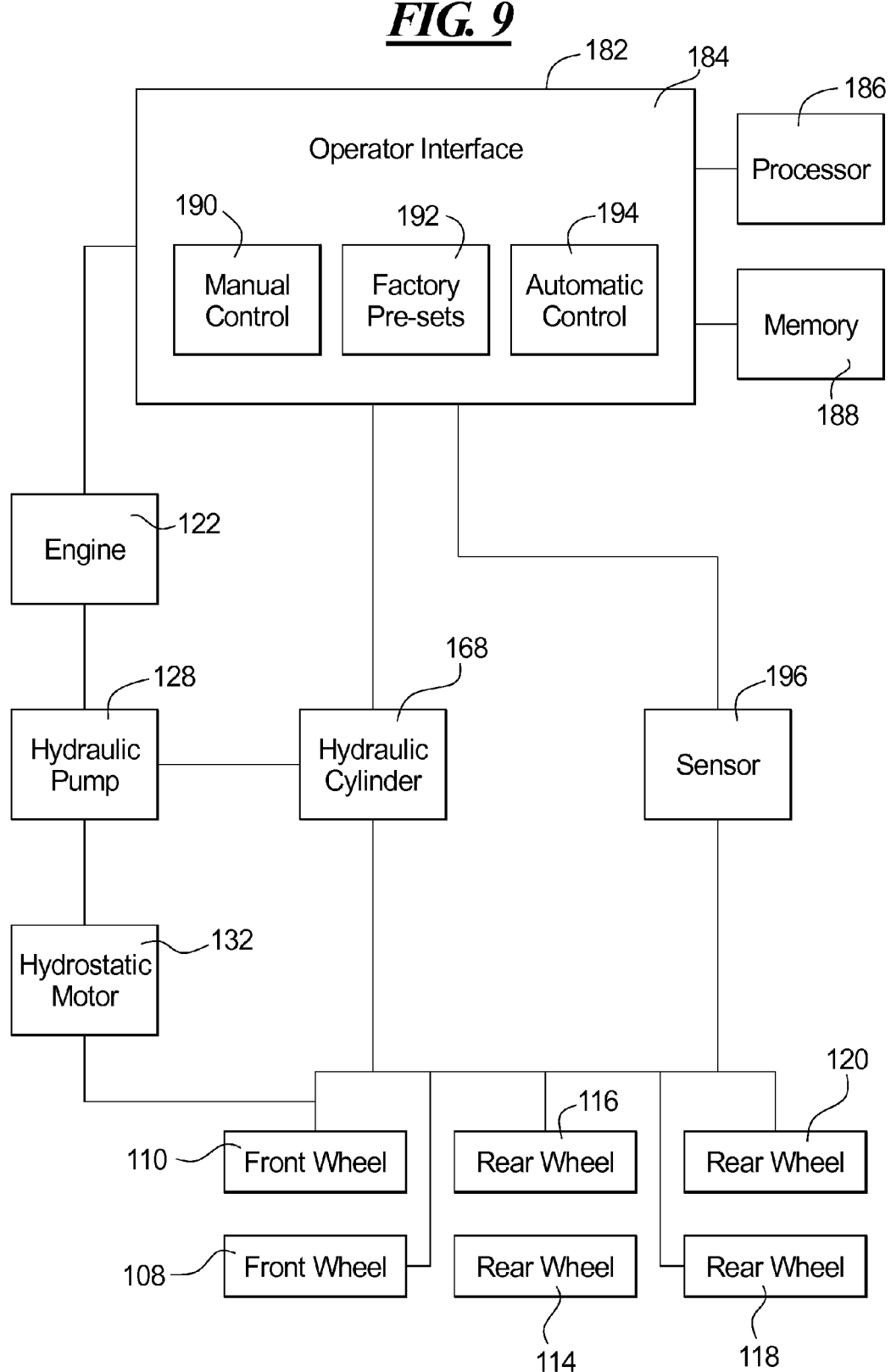
FIG. 9 is a schematic representation of an operator interface and control system according to one embodiment of the present disclosure.

With any of the aforementioned systems, the motor grader 100 can move the wheels 114, 116, 118, and 120 on-the-fly. As shown in FIG. 9, this feature can be incorporated into an operator interface 182 provided in the cab 124. The operator interface 182 may include a display 184 and be electronically coupled to a processor 186 and memory 188. The display 184 may include individual controls or switches for selecting various modes of operation. A manual control 190 may be used if the operator wishes to manually select the positioning of the wheels. A pre-set configuration control 192 may be used if the operator wishes to select one or more default settings programmed into the memory 188. For example, one setting may be for "RIPPING" in which case the rear wheels 114, 116, 118 and 120 may be moved rearward as indicated above. Another setting may be for "SNOW-PLOWING" wherein the wheels 114, 116, 118, and 120 may be moved forward.

Another mode may be accessed with automatic control 194. In such a mode, the longitudinal positioning of the wheels may be adjusted according to feedback received from sensors 196 operatively associated with each wheel. As shown in FIG. 9, the sensors 196, which may be load sensors or other types of sensors, may provide a closed loop feedback system to the operator interface 182. The operator interface 182 can then direct the hydraulic cylinders 168 (or the rack 174 & pinion 176, linear actuator 180, or other arrangement as the case may be) to move the wheels 114, 116, 118, and 120 to best balance the loads on each given the operating conditions and task being performed.

In addition to the above examples, one application where this may be particularly advantageous is when the motor grader 100 is being operated at speeds having known harmonic difficulties. More specifically, in current motor graders, resonance is commonly reached at certain speeds of operation, such as six or twelve miles per hour. At such speeds, the resulting harmonics cause the motor grader to bounce, thus disturbing the operator and detrimentally affecting the task being performed. However, in the automatic mode disclosed above, this disturbance could be sensed by providing the sensors 196 in the form of speed sensors, vibration sensors, frequency sensors, or the like and then feeding the sensed data back to the operator interface 182. The operator interface 182 could then automatically adjust the relative longitudinal positions of the wheels to dampen such vibrations.

In addition, the relative positions of the rear wheels 114, 116, 118, 120 may also be automatically adjusted based on a sensed position of the ripper attachment. For example, as the ripper attachment is lowered beyond a predetermined position as determined by a position sensor 196 or the like, the rear wheels 114, 116, 118, 120 may automatically be moved rearward to a location that better supports a ripping operation. Then, as the ripper is returned to a stowed position, the rear wheels may be automatically returned to a previous or default position.

Figure 10:
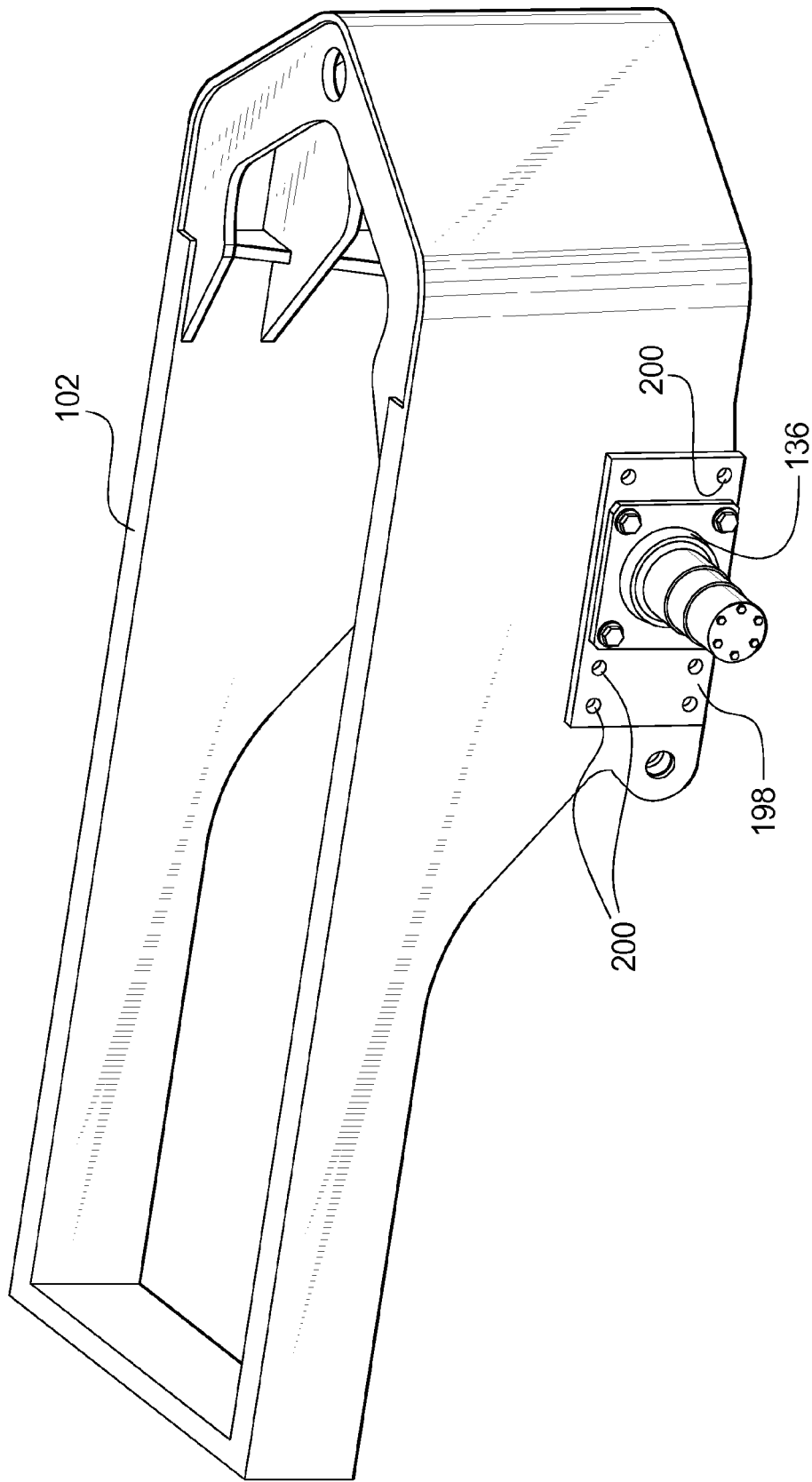
FIG. 10 an isometric view of a chassis of a grader constructed in accordance with the teachings of this disclosure and showing a mounting plate with a plurality of mounting locations for manual positioning of the grader wheels.

FIG. 10 provides an additional embodiment wherein the wheels 114, 116, 118, and 120 can be moved manually. In such embodiments, a mounting plate 198 can be provided with a plurality of mounting locations defined by mounting holes 200. By moving the desired wheel and associated drive shaft 134 and final drive 136, the overall wheel base 162 of the grader 100 can be manually altered as well. Again this points out one of the advantages afforded by having the wheels powered by a hydrostatic transmission in that the engine 122 and hydraulic pump 128 can stay fixed in position, with the hydraulic hoses 130 accommodating movement of the motors 132, drive shafts 134, final drives 136 and wheels 114, 116, 118, and 120.

Through all of the above embodiments, it can be seen that a wheel base 162 of the motor grader 100 is alterable. In addition, depending on the direction of movement of the wheels 114, 116, 118, and 120, the turning radius or articulation angle 166 of the motor grader 100 are able to be increased or decreased as needed. Finally, also depending on the direction of movement, blade clearance 160 and the ability of the grader 100 to finely grade are modifiable as well.

INDUSTRIAL APPLICABILITY

The technology disclosed herein has industrial applicability in a variety of settings such as, but not limited to, changing the center of gravity or wheel base of a motor grader. If a shorter turning radius is desired, the wheels of the motor grader can simply be moved closer together. If a ripper attachment is being used on the rear of the grader, the rear wheels can be moved rearward to reduce stress in the chassis of the motor grader, increase stability, and lessen the need for counterweights on the front of the grader. Conversely, if a snow plow is being implemented on the front of the grader, the wheels can be moved forward to distribute more weight to the front of the grader and thus greater downward force on the snowplow. Depending on the material or terrain being graded or pitch or incline of the ground it may be advantageous to adjust the wheel base as well.

In addition, given the tolerances currently expected with finish grading, the present disclosure can allow for maximum lengthening of the wheel base along a longitudinal axis of the motor grader to thereby limit the vertical displacement of the blade when the grader rolls over an obstruction in the surface being graded. The wheel base can also be adjusted to dampen resonance harmonics typically resulting a certain speeds of operation. Finally, by moving the rear wheels rearward, the grader is able to allow the blade to be rotated to a very aggressive angle without damaging the rear wheels, chassis or tires. The present disclosure sets forth arrangements allowing the grader to do all of the above safely, repeatably, and dynamically.

What is claimed is:

1. A motor grader, comprising:
   a chassis;
   a main frame extending from the chassis;
   a blade extending downwardly from the main frame;
   front wheels supporting the main frame;
   an engine supported by the chassis; and
   rear wheels supporting the chassis, the rear wheels comprising a first set of rear wheels and a second set of rear wheels arranged in tandem, the first set of rear wheels and the second set of rear wheels being individually positionally adjustable in both a forward direction and in a rearward direction along a longitudinal axis of the chassis.

2. The motor grader of claim 1, wherein the rear wheels includes first and second tandem drives, the tandem drives both being positionally adjustable relative to the longitudinal axis of the chassis.

3. The motor grader of claim 1, further including a hydraulic cylinder adapted to move the rear wheels relative to the longitudinal axis of the chassis.

4. The motor grader of claim 1, further including a rack and pinion system adapted to move the rear wheels relative to the longitudinal axis of the chassis.

5. The motor grader of claim 1, further including a linear actuator adapted to move the rear wheels relative to the longitudinal axis of the chassis.

6. The motor grader of claim 1, wherein the chassis includes a plurality of mounting holes, the position of the rear wheels being adjustable by manually moving the rear wheels to coincide with one of the mounting holes.

7. The motor grader of claim 1, wherein the rear wheels are powered by hydrostatic transmissions.

8. The motor grader of claim 1, wherein the front wheels support a percentage A of the overall weight of the motor grader, and the rear wheels support a percentage B of the overall weight of the motor grader, wherein the percentage A plus the percentage B equals one-hundred percent of the overall weight of the motor grader, and wherein the percentage A and the percentage B are both adjustable depending on the relative positions of the front wheels and the rear wheels along a longitudinal axis of the motor grader.

9. The motor grader of claim 8, wherein the percentage A is adjustable from ten percent to ninety percent and the percentage B is adjustable from ninety percent to ten percent.

10. The motor grader of claim 9, wherein the percentage A is forty percent and the percentage B is sixty percent.

11. The motor grader of claim 9, wherein the percentage A is twenty percent and the percentage B is eighty percent.

12. The motor grader of claim 1, further including an operator interface in communication with sensors operatively associated with the wheels, the operator interface enabling the positions of the wheels relative to the longitudinal axis of the motor grader to be dynamically altered.

13. The motor grader of claim 12, wherein the operator interface enables the wheels to be moved automatically based on feedback received from sensors mounted on the motor grader.

14. The motor grader of claim 12, wherein the operator interface includes a plurality of pre-set configurations each corresponding to different positions for the wheels relative to the longitudinal axis of the motor grader.

* * * * *